(12) United States Patent
Wang et al.

(10) Patent No.: US 12,202,022 B1
(45) Date of Patent: Jan. 21, 2025

(54) DEVICE FOR PREPARING ARTIFICIAL AGGREGATE BY PRESSURE INJECTION AND SOLIDIFICATION OF POWDER-BASED SOLID WASTE, PELLETIZATION, AND MAGNETIC SHELL REINFORCEMENT

(71) Applicant: Inner Mongolia Agricultural University, Hohhot (CN)

(72) Inventors: Hailong Wang, Hohhot (CN); Huanjie Su, Hohhot (CN); Yaolu Chen, Hohhot (CN); Huijun Xue, Hohhot (CN)

(73) Assignee: Inner Mongolia Agricultural University, Hohhot (CN)

( * ) Notice: Subject to any disclaimer, the term of this patent is extended or adjusted under 35 U.S.C. 154(b) by 0 days.

(21) Appl. No.: 18/797,532

(22) Filed: Aug. 8, 2024

(30) Foreign Application Priority Data

May 22, 2024 (CN) .......................... 202410639342.1

(51) Int. Cl.
*B09B 3/32* (2022.01)
*B09B 3/40* (2022.01)

(52) U.S. Cl.
CPC . *B09B 3/32* (2022.01); *B09B 3/40* (2022.01)

(58) Field of Classification Search
CPC ................................... B09B 3/32; B09B 3/40
See application file for complete search history.

(56) References Cited

FOREIGN PATENT DOCUMENTS

| CN | 111620580 A | | 9/2020 | |
|---|---|---|---|---|
| CN | 112919868 A | | 6/2021 | |
| CN | 213444794 U | | 6/2021 | |
| CN | 117599912 A | | 2/2024 | |
| CN | 117599915 A | | 2/2024 | |
| CN | 117732555 A | | 3/2024 | |
| CN | 117839818 A | | 4/2024 | |
| GB | 2550170 A | * | 11/2017 | ............... B09B 3/25 |
| JP | 2004510873 A | * | 4/2004 | |

* cited by examiner

*Primary Examiner* — Robert B Davis
(74) *Attorney, Agent, or Firm* — Bayramoglu Law Offices LLC

(57) ABSTRACT

The provided is a device for preparing an artificial aggregate by pressure injection and solidification of a powder-based solid waste, pelletization, and magnetic shell reinforcement. The device includes a pressure injection and solidification module, a rolling particle screening module, a zonal temperature-controlled sintering module, and a magnetic shell reinforcement module that are arranged in sequence from front to back, where the pressure injection and solidification module, the rolling particle screening module, the zonal temperature-controlled sintering module, and the magnetic shell reinforcement module are connected by conveyor belts. The device provides a function of pressure-injecting slurry with a specific function into the center of the artificial aggregate to improve the overall performance of the artificial aggregate. The device achieves rapid aggregate pelletization, and provides pressure for the forming process through elastic wheel sets.

10 Claims, 15 Drawing Sheets

DEVICE FOR PREPARING ARTIFICIAL AGGREGATE BY PRESSURE INJECTION AND SOLIDIFICATION OF POWDER-BASED SOLID WASTE, PELLETIZATION, AND MAGNETIC SHELL REINFORCEMENT

CROSS-REFERENCE TO THE RELATED APPLICATIONS

This application is based upon and claims priority to Chinese Patent Application No. 202410639342.1, filed on May 22, 2024, the entire contents of which are incorporated herein by reference.

TECHNICAL FIELD

The present disclosure relates to the technical field of artificial aggregate processing, and in particular to a device for preparing an artificial aggregate by pressure injection and solidification of a powder-based solid waste, pelletization, and magnetic shell reinforcement.

BACKGROUND

Artificial aggregate is a synthetic material used in construction and civil engineering, typically made from industrial waste (such as gangue and slag). These materials are processed through specific techniques to form the substitute for natural aggregate used in concrete and other building materials. In the context of resource conservation and environmental protection, the artificial aggregate reduces dependence on non-renewable resources such as natural sand and gravel, and significantly disposes of and utilizes industrial waste, thereby reducing environmental pollution. Spherical particles contribute to the flowability and workability of ordinary concrete mixtures with conventional strength, as compared to particles of other shapes, spherical particles can roll and distribute well during the mixing process, reducing voidage and significantly improving flowability. In addition, spherical particles with fine particle size improve the compactness and strength of concrete. Under the theory of maximum packing density, the multi-particle-size mixing of the precise-particle-size aggregate greatly optimizes the interlocking effect of the aggregate in the mixture, and significantly reduces the amount of cement slurry used, thereby optimizing the overall performance of concrete. Furthermore, microwave solidification can improve comprehensive properties of the artificial aggregate. Lightweight, high-strength, and precise-particle-size pelletization treatment helps to apply the artificial aggregate in construction projects and improve structural durability and endurance.

In the prior art, the pelletization and polishing treatment of the artificial aggregate is mainly implemented through the following different technical paths.

Patent CN117599912A (a plasma planetary ball mill) and Patent CN117732555A (an efficient ball mill) relate to a process of pelletizing and grinding the object through a sleeve and grinding balls. The object is put into the sleeve with the grinding balls, and the sleeve is rotated through a motor to achieve ball milling. In this process, most of the space inside the sleeve is not utilized, and the grinding balls are not dispersed throughout the space of the sleeve, resulting in low pelletizing efficiency and difficulty in achieving fine pelletizing quality.

Patent CN117839818A (a vibrating ball mill) relates to a process of putting the pelletized object on a rotating platform and implementing grinding and pelletization by vibrating a ball milling assembly. This process has certain requirements for the strength between the pelletized object and the ball milling assembly, and cannot provide controllable accuracy. During vibration, the mechanical motion generates significant noise. The ball milling assembly experiences significant wear and requires frequent replacement after prolonged use. In addition, the device is not suitable for small-particle-size pelletization, and after pelletization, there will be a lot of waste in powder form, which is not easy for recycling.

Patent CN117599915A (a plasma three-dimensional vibrating ball mill) relates to a process of combining a ball mill tank with horizontal vibration to pelletize the material. In this process, a high-voltage discharge system is introduced to assist in grinding. The device includes multiple mechanical and electrical components (such as carriage, main drive mechanism, horizontal oscillation mechanism, and the conductive ball mill tank), which require professional technical support for daily maintenance and troubleshooting, increasing maintenance costs and complexity. In addition, the pelletization process will consume a high amount of energy. In view of this, the present disclosure proposes a device for preparing an artificial aggregate by pressure injection and solidification of a powder-based solid waste, pelletization, and magnetic shell reinforcement.

SUMMARY

In order to solve the problems mentioned in the background section, an objective of the present disclosure is to provide a device for preparing an artificial aggregate by pressure injection and solidification of a powder-based solid waste, pelletization, and magnetic shell reinforcement.

To achieve the above objective, the present disclosure provides the following technical solution. A device for preparing an artificial aggregate by pressure injection and solidification of a powder-based solid waste, pelletization, and magnetic shell reinforcement includes a pressure injection and solidification module, a rolling particle screening module, a zonal temperature-controlled sintering module, and a magnetic shell reinforcement module that are arranged in sequence from front to back, where the pressure injection and solidification module, the rolling particle screening module, the zonal temperature-controlled sintering module, and the magnetic shell reinforcement module are connected by conveyor belts; and the pressure injection and solidification module includes a pressure-bearing track device, a pressure injection wheel device and a pressure solidification wheel device located at front and back sides above the pressure-bearing track device, a powder spraying device located in front of a bottom of the pressure-bearing track device, and a slurry conveying device located in back of the bottom of the pressure-bearing track device;

the pressure-bearing track device includes a support frame, a pressure-bearing track and front and back elastic wheel sets located on the support frame, and multiple sets of rubber hemispherical compaction grooves integrated on the pressure-bearing track; and the elastic wheel sets are configured to apply elastic compression to the pressure-bearing track;

the pressure injection wheel device includes a conveying rotating shaft, a conveying fixed shaft embedded inside the conveying rotating shaft, and a pressure injection wheel located at an outer side of the conveying rotating shaft and fixed through a connecting frame; multiple sets of injection shells are distributed at an outer side of the pressure injection wheel; a vertically downward single liquid conveying line is provided inside the conveying fixed shaft; multiple pipes are distributed inside the conveying rotating shaft and connected to liquid conveying dispensing pipes, respectively; and an end of each of the liquid conveying dispensing pipes is connected to an injection pipe through a dispensing adapter;

the zonal temperature-controlled sintering module includes a first-level spiral enclosure, a second-level spiral enclosure, a third-level spiral enclosure, and a fourth-level spiral enclosure that are arranged in sequence from inside to outside; and two top sides of a hopper are provided with conveying rollers supported at a bottom of the fourth-level spiral enclosure;

an upper front end of the pressure-bearing track is provided with a feeding, crushing, and pushing device for pushing a material in a cylindrical shape into the corresponding rubber hemispherical compaction groove;

the powder spraying device is configured to spray powder into the rubber hemispherical compaction grooves to prevent material adhesion; the slurry conveying device is configured to convey slurry to the conveying fixed shaft; when the conveying rotating shaft rotates, a baffle mechanism inside the pressure injection wheel drives the injection pipe to move downward and pass through the injection shell, so as to inject the slurry into a center of the material in the rubber hemispherical compaction groove; and a reset spring on the injection pipe rebounds to complete the injection; and the pressure solidification wheel device is configured to compress the material in the rubber hemispherical compaction groove into a spherical aggregate; when the pressure-bearing track continues to convey the spherical aggregate, the spherical aggregate falls off due to gravity and is sent to the rolling particle screening module through the corresponding conveyor belt; a scraper of the rolling particle screening module is configured to push the spherical aggregate to continuously roll and enter the zonal temperature-controlled sintering module through the corresponding conveyor belt; when the zonal temperature-controlled sintering module rolls, the spherical aggregate passes through the first-level spiral enclosure, the second-level spiral enclosure, the third-level spiral enclosure, and the fourth-level spiral enclosure in sequence to complete the sintering of the spherical aggregate and to undergo cooling treatment inside the fourth-level spiral enclosure; and the spherical aggregate is conveyed to the magnetic shell reinforcement module through the corresponding conveyor belt and undergoes impact shell reinforcement inside the magnetic shell reinforcement module.

Preferably, the feeding, crushing, and pushing device includes a feeding funnel located at the upper front end of the pressure-bearing track, a crushing gear and a conveying blade arranged in sequence from top to bottom inside the feeding funnel, and an extrusion box connected to a bottom of the feeding funnel; a bottom of the extrusion box is connected to extrusion nozzles; and the crushing gear and the conveying blade are connected by a same rotating shaft.

Preferably, the support frame is in an I-shape; four corners of the support frame are provided with drive wheels, respectively; and the drive wheels are tightly attached to an inner wall of the pressure-bearing track; and the elastic wheel set includes U-brackets, a wheel axle located on each of the U-brackets, supporting wheels located on the wheel axle, and vertical rods respectively fixed to lower middles of the U-brackets; and the vertical rods each are nested inside a supporting spring and pass through the support frame.

Preferably, the powder spraying device includes a pressure-bearing powder tank, a powder injection nozzle and a powder air pump fixed to the pressure-bearing powder tank, a powder conveying pipe connected to a discharge port of the pressure-bearing powder tank, and a discharge nozzle connected to an end of the powder conveying pipe.

Preferably, the slurry conveying device includes a pressure-bearing slurry tank and a slurry tank that are communicated with each other, and a slurry air pump located on the pressure-bearing slurry tank; and a discharge port of the slurry tank is connected to the single liquid conveying line through a slurry conveying pipe.

Preferably, the baffle mechanism includes a baffle fixing element fixed to the conveying fixed shaft and a baffle located at a bottom of the baffle fixing element; and the end of the liquid conveying dispensing pipe is inserted into the pressure injection wheel; the dispensing adapter is located at the end of the liquid conveying dispensing pipe; the dispensing adapter is communicated with the end of the liquid conveying dispensing pipe and fixed to an inner wall of the pressure injection wheel; the injection pipe is nested inside the reset spring and inserted into the dispensing adapter and the injection shell in sequence; and the injection pipe is further provided with an injection channel.

Preferably, the conveyor belt includes a first conveyor belt, a second conveyor belt, and a third conveyor belt; and the first conveyor belt, the second conveyor belt, and the third conveyor belt each are driven by drive rollers located at two inner ends thereof, the rolling particle screening module includes a disc enclosure fixed by support legs and the scraper located inside the disc enclosure and driven by a central rotating shaft; an accommodating hopper is located above a center of the disc enclosure; a bottom of the disc enclosure is provided with a sieve plate; and a receiving hopper is located below the sieve plate; and the magnetic shell reinforcement module includes a case, multiple steel balls located inside the case, a fan located at an inner top wall of the case, a turntable located below the case, and multiple sets of electromagnets fixed to an upper end of the turntable; and an upper front end of the case is provided with a feeding port.

Preferably, the first conveyor belt includes a front end extending to a position below a back of the pressure-bearing track and a back end extending to a position above the accommodating hopper; the second conveyor belt includes a front end extending to a position below the receiving hopper and a back end extending to a position above a feeding hopper; and the third conveyor belt includes a front end extending to a position below a back of the hopper and a back end extending into the feeding port.

Preferably, a lower end of the turntable is provided with a gearbox; a front top of the gearbox is provided with an electric motor; and the electric motor is configured to drive the turntable to rotate through a variable-speed gear set inside the gearbox.

Preferably, a discharge port at a bottom back of the case is connected to multiple sets of accommodating receptacles that are distributed from front to back; a backmost accommodating receptacle is connected to the case through a steel ball return conveyor; and a back side wall of the backmost accommodating receptacle is provided with a distribution magnet.

Preferably, the pressure solidification wheel device includes a pressure solidification wheel and multiple sets of steel cylindrical hemispherical grooves distributed at an outer side of the pressure solidification wheel.

Compared with the prior art, the present disclosure has the following beneficial effects. The present disclosure provides a function of pressure-injecting slurry with a specific function into the center of the artificial aggregate to improve the overall performance of the artificial aggregate.

The present disclosure can achieve rapid aggregate pelletization. The present disclosure preliminarily pelletizes the conveyed aggregate through the mutual compression of the rubber hemispherical compaction groove and the steel cylindrical hemispherical groove, thereby forming the pelletized aggregate with a particle size of 5 mm to 5 cm.

The present disclosure provides pressure for the forming process through the elastic wheel sets.

The present disclosure applies microwave-based zonal temperature-controlled solidification treatment to the artificial aggregate, enhancing the mechanical properties and durability of the aggregate. The present disclosure increase temperatures in the microwave heating part gradually, and finally designs the anaerobic environment air cooling zone to prevent aggregate oxidation.

The present disclosure achieves fine polishing of the aggregate surface, and performs high-speed high-frequency rotational impact on the surface of the aggregate through the steel balls, so as to reinforce the shell of the pelletized aggregate.

Figure 1:
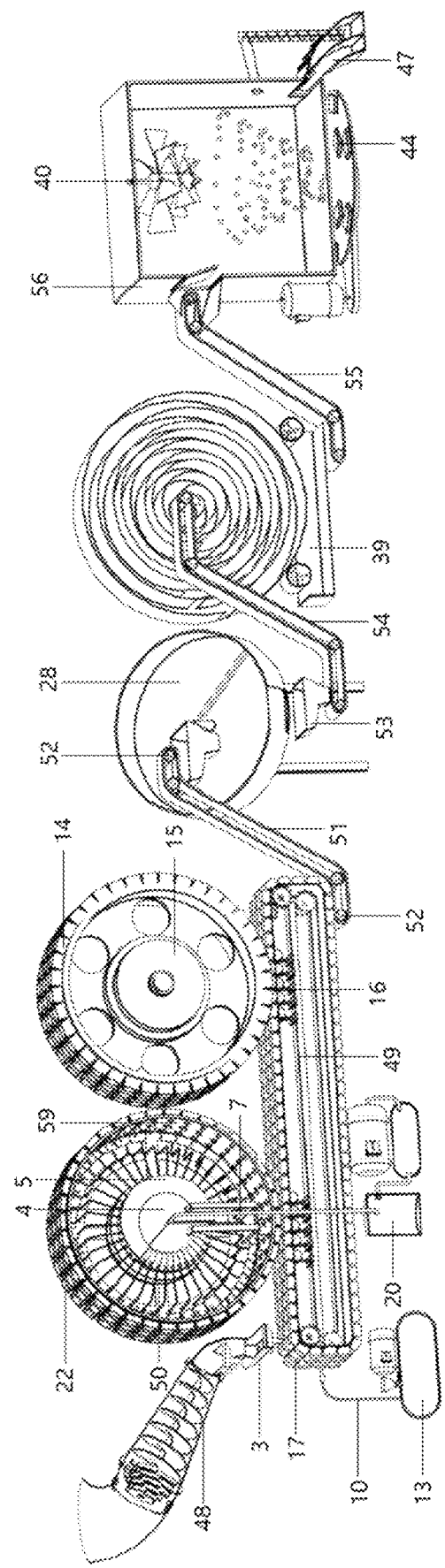
FIG. 1 is an overall three-dimensional structural diagram view of a device for preparing an artificial aggregate by pressure injection and solidification of a powder-based solid waste, pelletization, and magnetic shell reinforcement according to the present disclosure.
Figure 2:
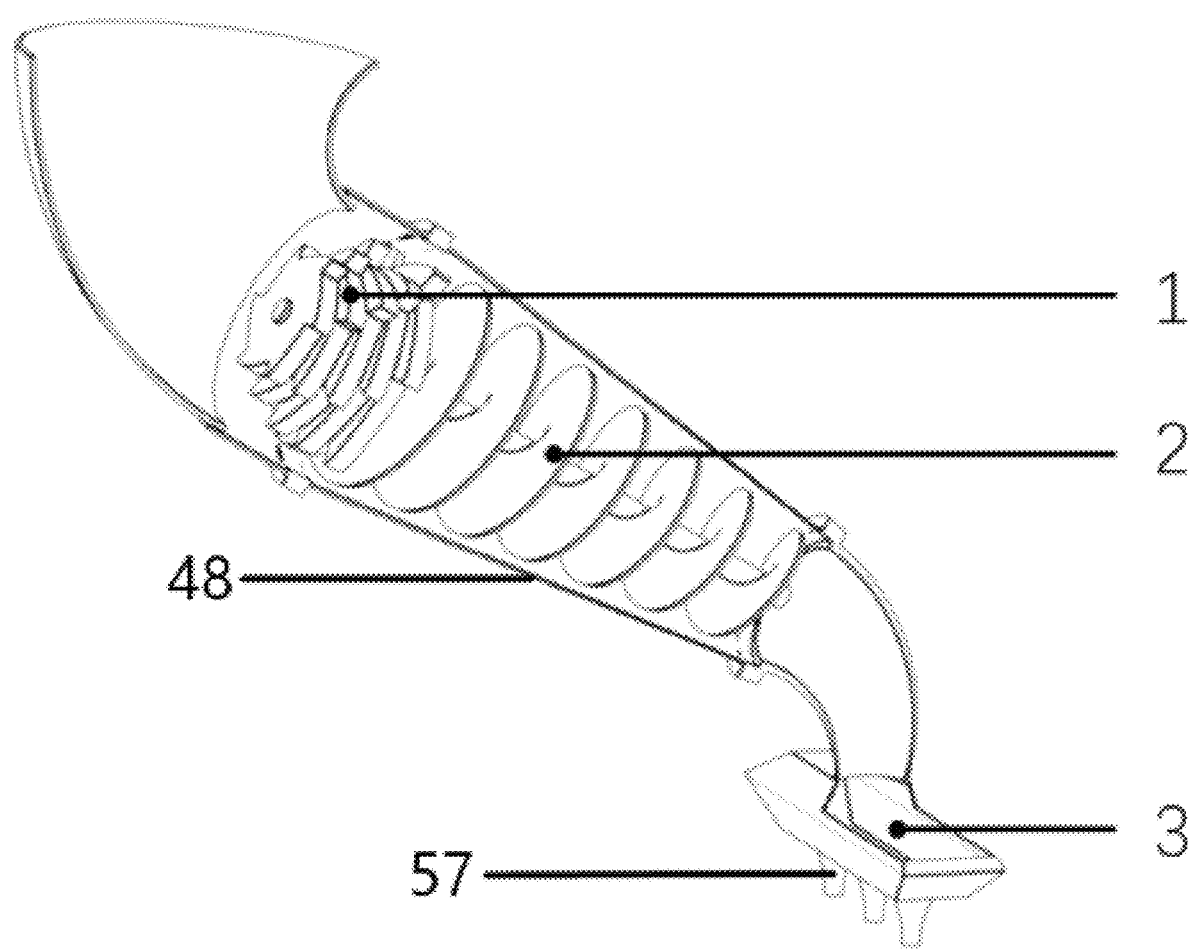
FIG. 2 is a section view of a feeding, crushing, and pushing device according to the present disclosure.
Figure 3:
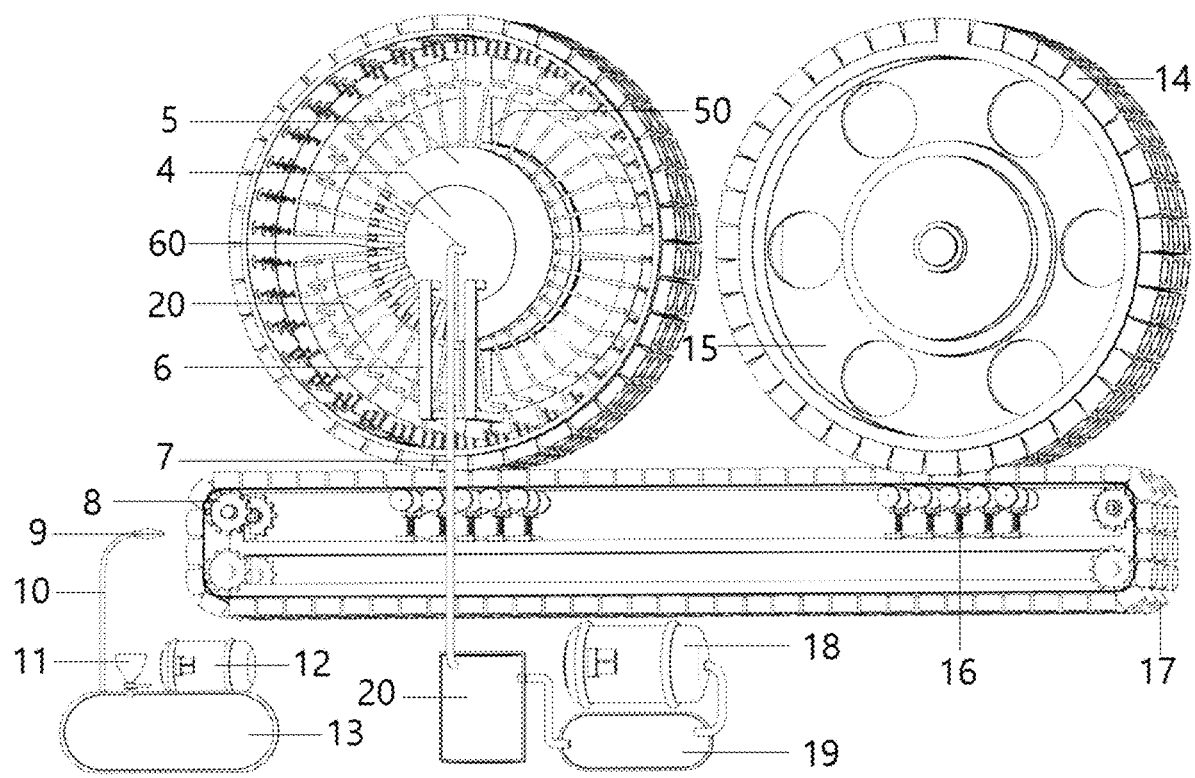
FIG. 3 is a structural diagram of a pressure injection and solidification module according to the present disclosure.

REFERENCE NUMERALS 1. crushing gear; 2. conveying blade; 3. extrusion box; 4. conveying fixed shaft; 5. conveying rotating shaft; 6. baffle fixing element; 7. slurry conveying pipe; 8. drive wheel; 9. nozzle; 10. powder conveying pipe; 11. powder injection nozzle; 12. powder air pump; 13. pressure-bearing powder tank; 14. steel cylindrical hemispherical groove; 15. pressure solidification wheel; 16 elastic wheel set; 161. supporting spring; 162. vertical rod; 163. U-bracket; 164. supporting wheel; 165. wheel axle; 17. rubber hemispherical compaction groove; 18. slurry air pump; 19. pressure-bearing slurry tank; 20. slurry tank; 21. liquid conveying dispensing pipe; 22. injection shell; 23. baffle; 24. injection pipe; 25. dispensing adapter; 26. reset spring; 27. accommodating hopper; 28. disc enclosure; 29. central rotating shaft; 30. scraper; 31. sieve plate; 32. support leg; 33. fourth-level spiral enclosure; 34. third-level spiral enclosure; 35. second-level spiral enclosure; 36. first-level spiral enclosure; 37. feeding hopper; 38. conveying roller; 39. hopper; 40. fan; 41. feeding port; 42. electric motor; 43. gearbox; 44. electromagnet; 45. steel ball return conveyor; 46. distribution magnet; 47. accommodating receptacle; 48. feeding funnel; 49. support frame; 50. connecting frame; 51 first conveyor belt; 52. drive roller; 53. receiving hopper; 54 second conveyor belt; 55. third conveyor belt; 56. case; 57. extrusion nozzle; 58. injection channel; 59. pressure injection wheel; 60. liquid conveying line; and 61. pipe.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

As shown in FIGS. 1 to 15, the present disclosure provides the following technical solution.

Embodiment 1

A device for preparing an artificial aggregate by pressure injection and solidification of a powder-based solid waste, pelletization, and magnetic shell reinforcement includes a pressure injection and solidification module, a rolling particle screening module, a zonal temperature-controlled sintering module, and a magnetic shell reinforcement module that are arranged in sequence from front to back. The pressure injection and solidification module, the rolling particle screening module, the zonal temperature-controlled sintering module, and the magnetic shell reinforcement module are connected by conveyor belts. The conveyor belt includes first conveyor belt 51, second conveyor belt 54, and third conveyor belt 55. The first conveyor belt 51, the second conveyor belt 54, and the third conveyor belt 55 each are driven by drive rollers 52 located at two inner ends thereof.

A front end of the first conveyor belt 51 extends to a position below a back of a pressure-bearing track, and a back end of the first conveyor belt 51 extends to a position above accommodating hopper 27. A front end of the second conveyor belt 54 extends to a position below receiving hopper 53, and a back end of the second conveyor belt 54 extends to a position above feeding hopper 37. A front end of the third conveyor belt 55 extends to a position below a back of hopper 39, and a back end of the third conveyor belt 55 extends into the feeding port 41.

Each module is connected to a ground through a supporting component, which provides support for each module. For the sake of intuitive and convenient demonstration of the present disclosure, some necessary supporting components are omitted and will not be described in detail.

The pressure injection and solidification module includes a pressure-bearing track device, a pressure injection wheel device and a pressure solidification wheel device located at front and back sides above the pressure-bearing track device, a powder spraying device located in front of a bottom of the pressure-bearing track device, and a slurry conveying device located in back of the bottom of the pressure-bearing track device.

The pressure-bearing track device includes support frame 49, the pressure-bearing track and front and back elastic wheel sets 16 located on the support frame 49, and multiple sets of rubber hemispherical compaction grooves 17 integrated on the pressure-bearing track. The elastic wheel sets 16 are configured to apply elastic compression to the pressure-bearing track.

Figure 4:
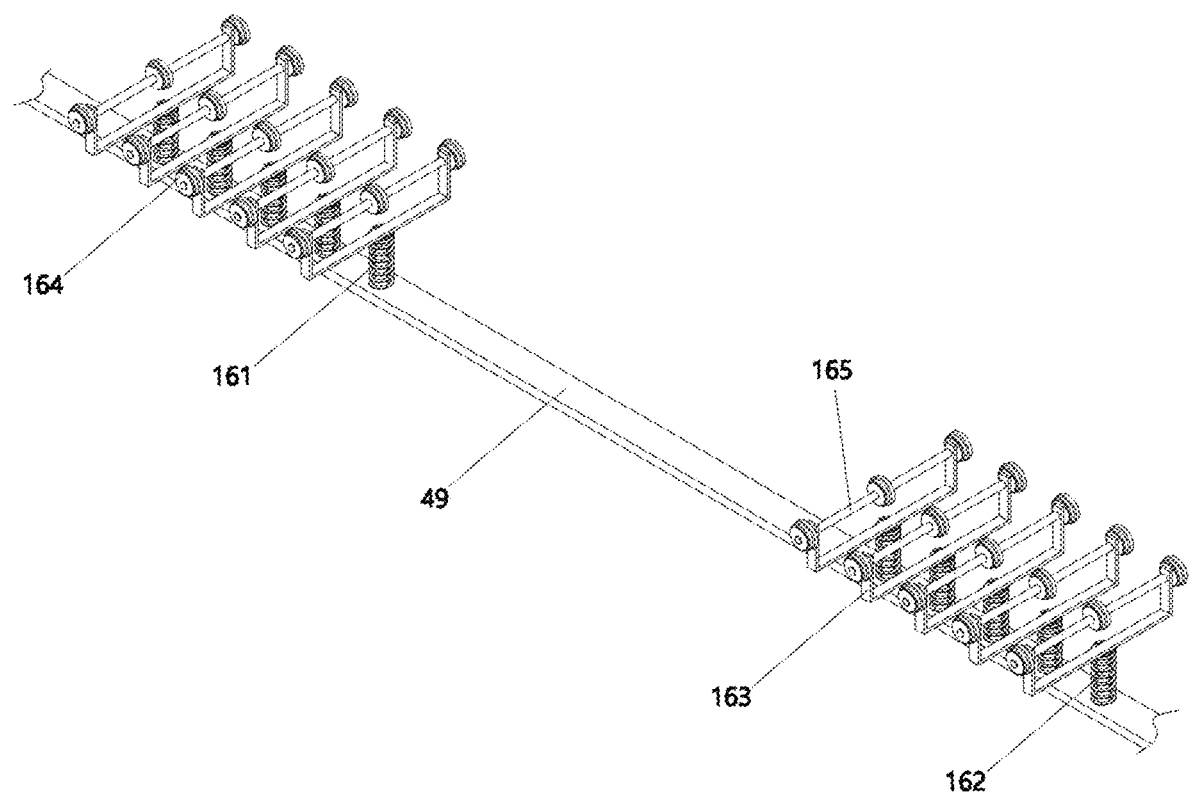
FIG. 4 is a three-dimensional structural diagram of an elastic wheel set according to the present disclosure.
Figure 5:
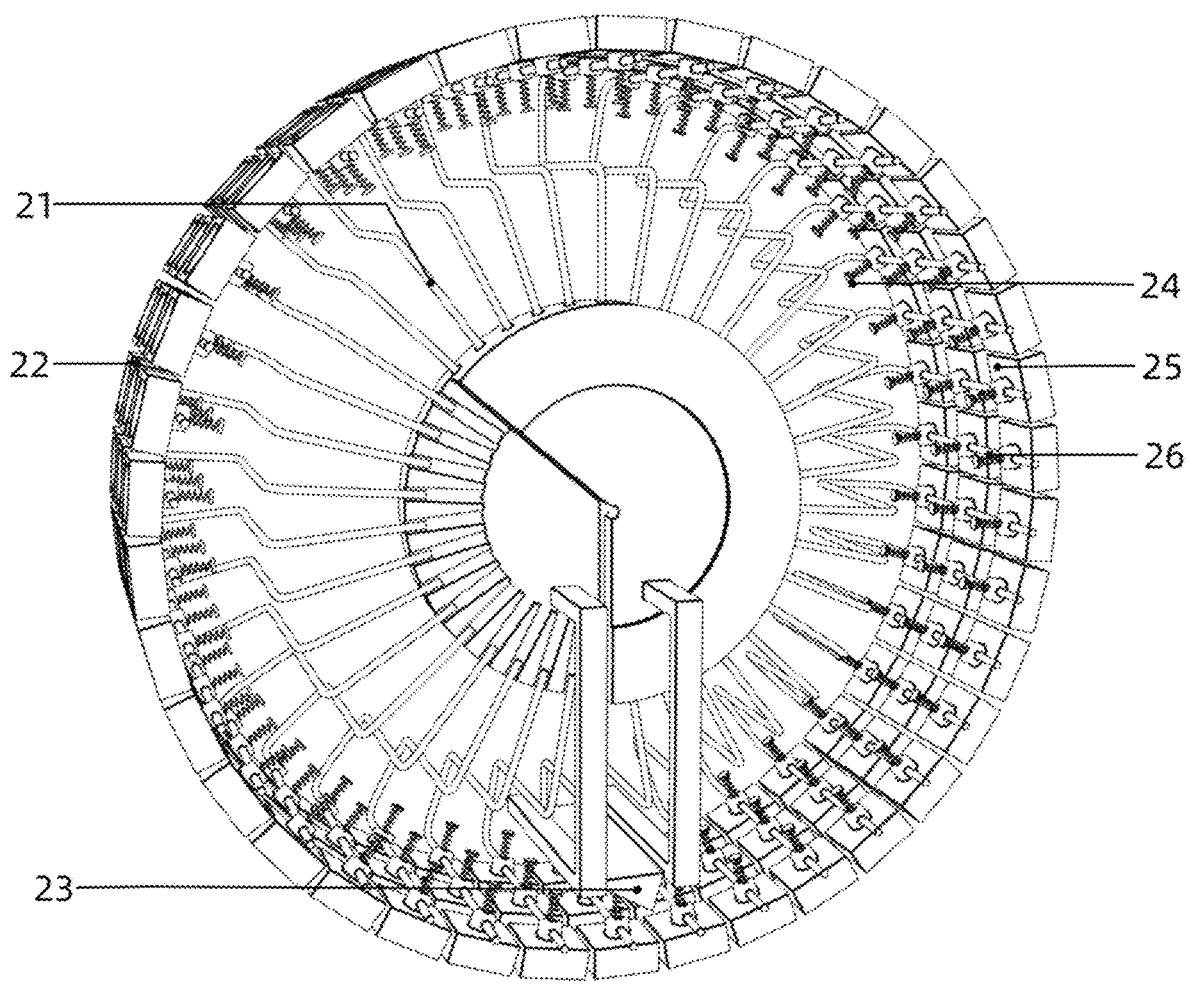
FIG. 5 is a structural diagram of a liquid conveying dispensing pipe, an injection shell, a baffle, and an injection pipe according to the present disclosure.

The elastic wheel set 16 includes U-brackets 163, wheel axle 165 located on each of the U-brackets 163, supporting wheels 164 located on the wheel axle 165, and vertical rods 162 respectively fixed to lower middles of the U-brackets 163. The vertical rods 162 each are nested inside supporting spring 161 and pass through the support frame 49 (as shown in FIG. 4).

The pressure injection wheel device includes conveying rotating shaft 5, conveying fixed shaft 4 embedded inside the conveying rotating shaft 5, and pressure injection wheel 59 located at an outer side of the conveying rotating shaft 5 and fixed through connecting frame 50. Multiple sets of injection shells 22 are distributed at an outer side of the pressure injection wheel 59. Vertically downward single liquid conveying line 60 is provided inside the conveying fixed shaft 4. Multiple pipes 61 are distributed inside the conveying rotating shaft 5 and connected to liquid conveying dispensing pipes, respectively 21, respectively. An end of each of the liquid conveying dispensing pipes 21 is connected to injection pipe 24 through dispensing adapter 25.

The zonal temperature-controlled sintering module includes a disc and first-level spiral enclosure 36, second-level spiral enclosure 35, third-level spiral enclosure 34, and fourth-level spiral enclosure 33 that are arranged in sequence from inside to outside on the disc. Two top sides of the hopper 39 are provided with conveying rollers 38 supported at a bottom of the fourth-level spiral enclosure 33.

The first-level spiral enclosure 36, the second-level spiral enclosure 35, the third-level spiral enclosure 34, and the fourth-level spiral enclosure 33 are driven by the conveying rollers 38 to rotate synchronously, causing spherical aggregate to enter the first-level spiral enclosure 36, the second-level spiral enclosure 35, the third-level spiral enclosure 34, and the fourth-level spiral enclosure 33 in sequence.

A top of the first-level spiral enclosure 36, the second-level spiral enclosure 35, the third-level spiral enclosure 34, and the fourth-level spiral enclosure 33 is provided with a sealing top cover that creates a closed state inside the first-level spiral enclosure 36, the second-level spiral enclosure 35, the third-level spiral enclosure 34, and the fourth-level spiral enclosure 33. In this way, the aggregate in the first-level spiral enclosure 36, the second-level spiral enclosure 35, the third-level spiral enclosure 34, and the fourth-level spiral enclosure 33 cannot fly out. In addition, during the first, second and third-level sintering, the carbon element in the gangue produces carbon dioxide gas, which causes a significant shrink in an internal grouted volume and enables the formation of a cavity in the aggregate. At this point, the artificial aggregate is a hollow aggregate. During this process, a small portion of the released carbon dioxide is absorbed by the porous aggregate while a majority thereof enters the fourth-level spiral enclosure 33 to provide a carbon dioxide environment for fourth-level anaerobic cooling. The design ensures that the aggregate in the fourth-level spiral enclosure 33 is in an anaerobic environment.

The rotation direction of the sintering module is consistent with the spiral direction of the spiral enclosure, such that the aggregate will not flow back to the upper-level spiral enclosure under the action of inertial force.

A microwave heating part is wound around the first-level spiral enclosure 36, the second-level spiral enclosure 35, the third-level spiral enclosure 34, and the fourth-level spiral enclosure 33 according to temperature requirements. The temperatures at these levels increase gradually, and the temperature setting ranges are as follows. The first-level spiral enclosure 36 forms a 0-400° C. first heating zone, the second-level spiral enclosure 35 forms a 400-800° C. second heating zone, the third-level spiral enclosure 34 forms an 800-1200° C. third heating zone, and the fourth-level spiral enclosure 33 forms an anaerobic environment air cooling zone to avoid aggregate oxidation. The disc speed is adjustable, with a maximum speed of 10 m/s, to achieve rapid solidification and improve work efficiency.

The outermost enclosure of the first-level spiral enclosure 36, the second-level spiral enclosure 35, the third-level spiral enclosure 34, and the fourth-level spiral enclosure 33 is made of ceramic. The insulation effect of the ceramic maintains the heating independence of each heating zone and avoids interference from other heating zones.

The first-level spiral enclosure 36, the second-level spiral enclosure 35, the third-level spiral enclosure 34, and the fourth-level spiral enclosure 33 each are provided with an opening for the spherical aggregate to enter the first-level spiral enclosure 36, the second-level spiral enclosure 35, the third-level spiral enclosure 34, and the fourth-level spiral enclosure 33 in sequence when the disc rotates.

That is, the zonal temperature-controlled sintering module is a multi-level temperature-controlled rotary heating disc. The disc surface is divided into multiple independent microwave heating zones (the first-level spiral enclosure 36, the second-level spiral enclosure 35, the third-level spiral enclosure 34, and the fourth-level spiral enclosure 33). The temperatures in these microwave heating zones gradually increase, and the outermost ring of the disc surface (i.e. The fourth-level spiral enclosure 33) forms the anaerobic environment cooling zone to avoid carbonization and oxidation of the aggregate during the cooling process.

An upper front end of the pressure-bearing track is provided with a feeding, crushing, and pushing device for pushing a material in a cylindrical shape into the corresponding rubber hemispherical compaction groove 17.

The powder spraying device is configured to spray powder into the rubber hemispherical compaction grooves 17 to prevent material adhesion. The slurry conveying device is configured to convey slurry to the conveying fixed shaft 4.

The powder spraying device includes pressure-bearing powder tank 13, powder injection nozzle 11 and powder air pump 12 fixed to the pressure-bearing powder tank 13, powder conveying pipe 10 connected to a discharge port of the pressure-bearing powder tank 13, and discharge nozzle 9 connected to an end of the powder conveying pipe 10.

The slurry conveying device includes pressure-bearing slurry tank 19 and slurry tank 20 that are communicated with each other, and slurry air pump 18 located on the pressure-bearing slurry tank 19. A discharge port of the slurry tank 20 is connected to the single liquid conveying line 60 through slurry conveying pipe 7.

When the conveying rotating shaft 5 rotates, a baffle mechanism inside the pressure injection wheel 59 drives the injection pipe 24 to move downward and pass through the injection shell 22, so as to inject the slurry into a center of the material in the rubber hemispherical compaction groove 17. Reset spring 26 on the injection pipe 24 rebounds to complete the injection.

Under an elastic force of the supporting spring 161 on the U-bracket 163, the supporting wheels 164 on the U-bracket 163 are tightly attached to an inner top of the pressure-bearing track. When the rubber hemispherical compaction grooves 17 are pressed into hemispherical grooves inside the injection shells 22, the supporting wheels provide elastic compression support to the rubber hemispherical compaction grooves 17 at the top of the pressure-bearing track.

The pressure solidification wheel device is configured to compress the material in the rubber hemispherical compaction groove 17 into the spherical aggregate. The pressure solidification wheel device includes pressure solidification wheel 15 and multiple sets of steel cylindrical hemispherical grooves 14 distributed at an outer side of the pressure solidification wheel 15. The pressure solidification wheel 15 rotates to cause the corresponding rubber hemispherical compression grooves 17 to be pressed into hemispherical grooves inside the steel cylindrical hemispherical groove 14. Under the strong pressure of the steel cylindrical hemispherical grooves 14 on the rubber hemispherical compaction grooves 17, the materials inside the rubber hemispherical compaction grooves 17 are compressed into a spherical shape.

Under the elastic force of the supporting spring 161 on the U-bracket 163, the supporting wheels 164 on the U-bracket 163 are tightly attached to the inner top of the pressure-bearing track. When the rubber hemispherical compaction grooves 17 are pressed into the hemispherical grooves of the steel cylindrical hemispherical grooves 14, supporting wheels provides elastic compression support to the rubber hemispherical compaction grooves 17 at the top of the pressure-bearing track.

When the pressure-bearing track continues to convey the spherical aggregate, the spherical aggregate falls off due to gravity and is sent to the rolling particle screening module through the corresponding conveyor belt. Scraper 30 of the rolling particle screening module is configured to push the spherical aggregate to continuously roll and enter the zonal temperature-controlled sintering module through the corresponding conveyor belt. When the zonal temperature-controlled sintering module rolls, the spherical aggregate passes through the first-level spiral enclosure 36, the second-level spiral enclosure 35, the third-level spiral enclosure 34, and the fourth-level spiral enclosure 33 in sequence to complete the sintering of the spherical aggregate and to undergo cooling treatment inside the fourth-level spiral enclosure 33. Afterwards, the spherical aggregate is conveyed through the corresponding conveyor belt to the magnetic shell reinforcement module and undergoes impact shell reinforcement inside the magnetic shell reinforcement module.

The feeding, crushing, and pushing device includes feeding funnel 48 located at the upper front end of the pressure-bearing track, crushing gear 1 and conveying blade 2 arranged in sequence from top to bottom inside the feeding funnel 48, and extrusion box 3 connected to a bottom of the feeding funnel 48. A bottom of the extrusion box 3 is connected to extrusion nozzles 57. The crushing gear 1 and the conveying blade 2 are connected by a same rotating shaft.

The crushing gear 1 and the conveying blade 2 rotate synchronously to push the material in the feeding funnel 48 to the extrusion box 3, and finally the material is extruded into the rubber hemispherical compaction grooves 17 by the extrusion nozzles 57. The materials extruded by the extrusion nozzles 57 are in a cylindrical shape.

The support frame 49 is in an I-shape. Four corners of the support frame 49 are provided with drive wheels, respectively 8, respectively. The drive wheels 8 are tightly attached to an inner wall of the pressure-bearing track. When the drive wheels 8 rotate, the pressure-bearing track rotates.

The baffle mechanism includes baffle fixing element 6 fixed to the conveying fixed shaft 4 and baffle 23 located at a bottom of the baffle fixing element 6.

A lower surface of the baffle 23 is provided with an inclined surface. When the injection pipe 24 is about to enter a critical position of the baffle 23, an upper end of the injection pipe 24 just touches a highest point of the inclined surface of the lower end surface of the baffle 23. Subsequently, as the upper end of the injection pipe 24 gradually comes into contact with the inclined surface of the lower end surface of the baffle 23, the inclined surface of the lower end surface of the baffle 23 pushes the injection pipe 24 downward, causing the injection pipe 24 to move downward.

The end of the liquid conveying dispensing pipe 21 is inserted into the pressure injection wheel 59. The dispensing adapter 25 is located at the end of the liquid conveying dispensing pipe 21. The dispensing adapter 25 is communicated with the end of the liquid conveying dispensing pipe 21, and the dispensing adapter 25 is fixed to an inner wall of the pressure injection wheel 59. The injection pipe 24 is nested inside the reset spring 26 and inserted into the dispensing adapter 25 and the injection shell 22 in sequence. The injection pipe 24 is further provided with injection channel 58.

Regarding the design of injection pipe 24, it should be emphasized that the design between the injection pipe 24 and the injection shell 22 needs to avoid material accumulation. When the conveying rotating shaft 5 rotates, the baffle mechanism inside the pressure injection wheel 59 drives the injection pipe 24 to move downward and pass through the injection shell 22, so as to inject the slurry into the center of the material in the rubber hemispherical compaction groove 17. The reset spring 26 on the injection pipe 24 rebounds to complete the injection. The injection pipe 24 is located at an upper side of the injection shell 22, and there is a certain distance between the injection pipe and the injection shell after the reset spring 26 rebounds.

The rolling particle screening module includes disc enclosure 28 fixed by support legs 32 and the scraper 30 located inside the disc enclosure 28 and driven by central rotating shaft 29. The accommodating hopper 27 is located above a center of the disc enclosure 28. A bottom of the disc enclosure 28 is provided with sieve plate 31. The receiving hopper 53 is located below the sieve plate 31.

The disc enclosure 28 is fixed to a motor. An output end of the motor is connected to the central rotating shaft 29. When the motor is working, the central rotating shaft 29 drives the scraper 30 to rotate within the disc enclosure 28.

The magnetic shell reinforcement module includes case 56, multiple steel balls located inside the case 56, fan 40 located at an inner top wall of the case 56, turntable located below the case 56, and multiple sets of electromagnets 44 fixed to an upper end of the turntable. An upper front end of the case 56 is provided with the feeding port 41.

A lower end of the turntable is provided with gearbox 43. A front top of the gearbox 43 is provided with electric motor 42. The electric motor 42 drives the turntable to rotate through a variable-speed gear set inside the gearbox 43.

A discharge port at a bottom back of the case 56 is connected to multiple sets of accommodating receptacles 47 that are distributed from front to back. The backmost accommodating receptacle 47 is connected to the case 56 through steel ball return conveyor 45. A back side wall of the backmost accommodating receptacle 47 is provided with distribution magnet 46.

Alternatively, the discharge port at the bottom back of the case 56 is connected to two channels of accommodating receptacles 47 distributed vertically. The finished aggregate is discharged through the lower accommodating receptacle 47, and the upper accommodating receptacle 47 is provided with distribution magnet 46.

The steel ball return conveyor 45 includes a vertical pipe inserted into the backmost accommodating receptacle 47 and a horizontal pipe connected to a top of the vertical pipe. The other end of the horizontal pipe is connected to the case 56. A screw conveyor is provided inside the vertical pipe. The screw conveyor rotates under the drive of the motor to convey the spherical aggregate in the backmost receptacle 47 to the case 56 through the vertical pipe and the horizontal pipe.

In the current production process, the single-material artificial aggregate cannot meet the current high-performance requirements. In addition, the traditional pelletization technology is inefficient and often cannot guarantee the quality and consistency of the spherical product, which especially affects precision applications.

The existing solidification and polishing steps usually require independent equipment, which increases production complexity and increases time and economic costs.

The current production process cannot well achieve the lightweight goal, but cause significant losses to the activity of the waste such as fly ash. The present disclosure effectively protects the activity of the waste through heavy oil, and features high mixing consistency, minimal amount of heavy oil used, and a large amount of evenly distributed product micropores.

In the prior art, there are basically no lightweight hollow artificial aggregate products. In the present disclosure, the gangue slurry is injected into the aggregate through a pressure injection process. During the sintering process, carbon combustion inside the gangue forms cavities (the load borne by the internal core during the stress process of the aggregate is relatively small, similar to the principle of hollow floor slabs), and the $CO_2$ gas produced is partially absorbed and fixed by the carbide slag in the shell. Due to the formation of the internal cavities, the lightweight goal is well achieved, with minimal $CO_2$ emissions during the production process.

At present, in the production of the artificial aggregate, the sintering process does not consider the coagulation effect of the hydration element, resulting in higher energy consumption under the same production intensity. The present disclosure performs microwave activation sintering treatment in the sintering process, including the first half dominated by microwave activation rapid solidification and the second half dominated by sintering, fully expanding the activity of the waste and reducing production energy consumption.

At present, in the production of the artificial aggregate, the sintered aggregate is mainly cooled by natural cooling. Considering that the cooling and oxidation effect in the air after sintering will reduce the material property, the present disclosure adopts $CO_2$ air-cooling technology on the basis of heat recovery to achieve cooling, carbon fixation, heat recovery, etc., strengthen the physical characteristics of the aggregate, reduce carbon emissions, and achieve carbon sequestration.

In the prior art, there is basically no process for reshaping and reinforcing the outer shell of the artificial aggregate after sintering. The sintering process causes changes in the composition of the aggregate, resulting in variations in the morphology and particle distribution of the aggregate. In the present disclosure, 5 mm 32-hedron vertex-passivated vacuum-formed steel balls are driven by the rotating magnetic disc to continuously impact the aggregate at high frequency and high speed, thereby removing surface debris and protrusions of the aggregate. Through the continuous low-force high-frequency impact, the present disclosure reinforces the outer shell of the aggregate and improves the particle size accuracy of the aggregate.

Specifically, when in use, the fly ash is filled into the powder injection nozzle 11, the gangue powder slurry of suitable consistency is filled into the slurry tank 20, and waste of certain consistency is filled through an inlet of the feeding funnel 48. The waste includes fly ash and carbide slag (with certain fineness), which are mixed based on heavy oil and a special ratio.

The zonal temperature-controlled sintering module is started to preheat to a specified temperature. The magnetic shell reinforcement module is started, and whether the steel balls run properly is checked.

The spacing and alignment accuracy between the pressure injection wheel 59 as well as the pressure solidification wheel 15 and the pressure-bearing track are adjusted, and whether the injection pipe 24 is unobstructed is checked. An appropriate size of the sieve plate 31 is chosen. The force of the elastic wheel set 16, as well as the distance between the scraper 30 and the bottom wall of the disc enclosure 28, is adjusted.

The powder air pump 12 is working, causing the fly ash in the pressure-bearing powder tank 13 to be sprayed into the corresponding rubber hemispherical compaction groove 17 through the powder conveying pipe 10 and the discharge nozzle 9. The drive wheels 8 rotate, causing the pressure-bearing track to rotate. As the pressure-bearing track rotates, the fly ash is sprayed into the rubber hemispherical compaction grooves 17 in sequence.

The slurry air pump 18 is working, causing the slurry in the slurry tank 20 to be introduced into the conveying fixed shaft 4 through the pressure-bearing slurry tank 19 and the slurry conveying pipe 7. Due to gravity, the slurry enters the liquid conveying line 60.

Subsequently, the material in the feeding funnel 48 is extruded into the rubber hemispherical compaction grooves 17 through the extrusion nozzles 57 at the bottom of the extrusion box 3. The conveying rotating shaft 5 outside the conveying fixed shaft 4 rotates, causing the pressure injection wheel 59 to rotate.

Figure 6:
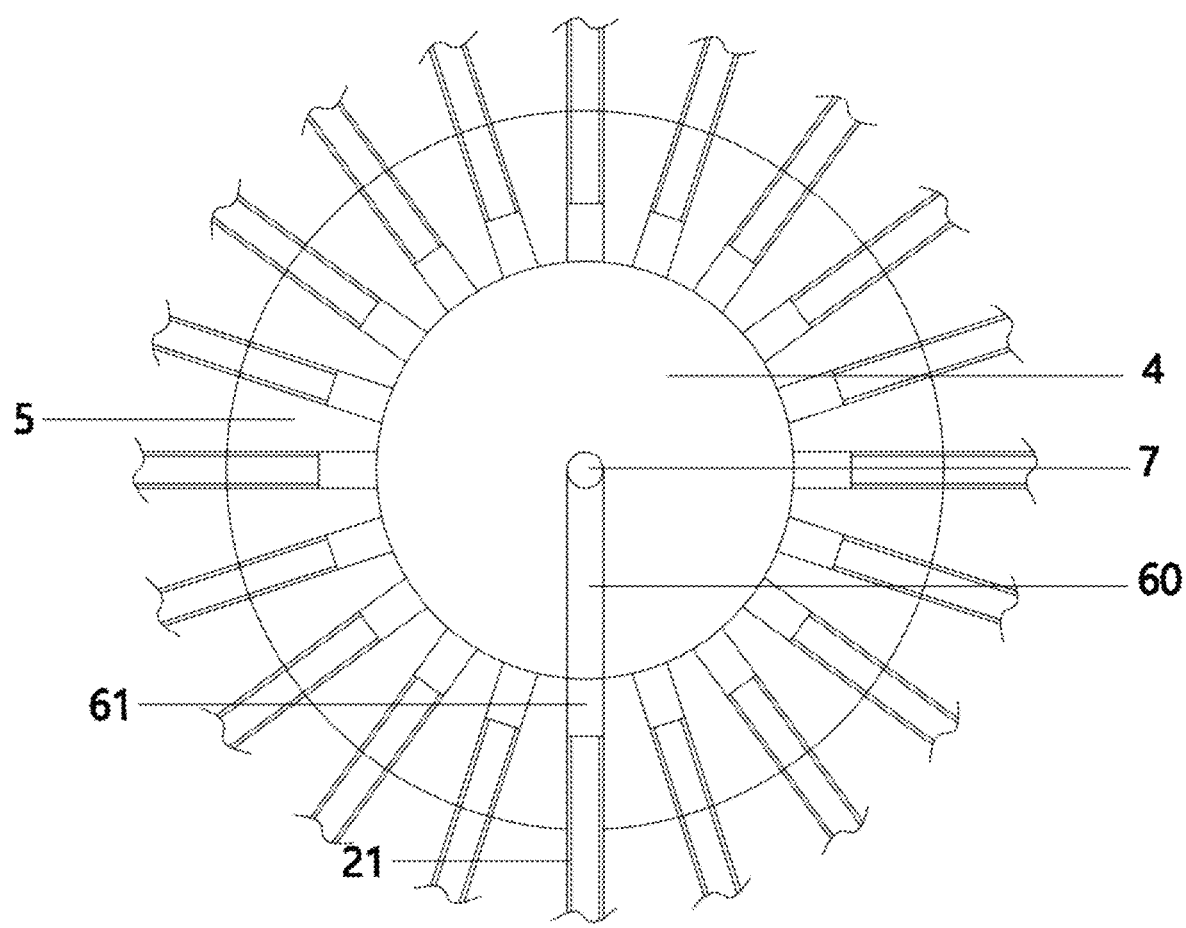
FIG. 6 is a section view of a conveying fixed shaft and a conveying rotating shaft that are connected according to the present disclosure.
Figure 7:
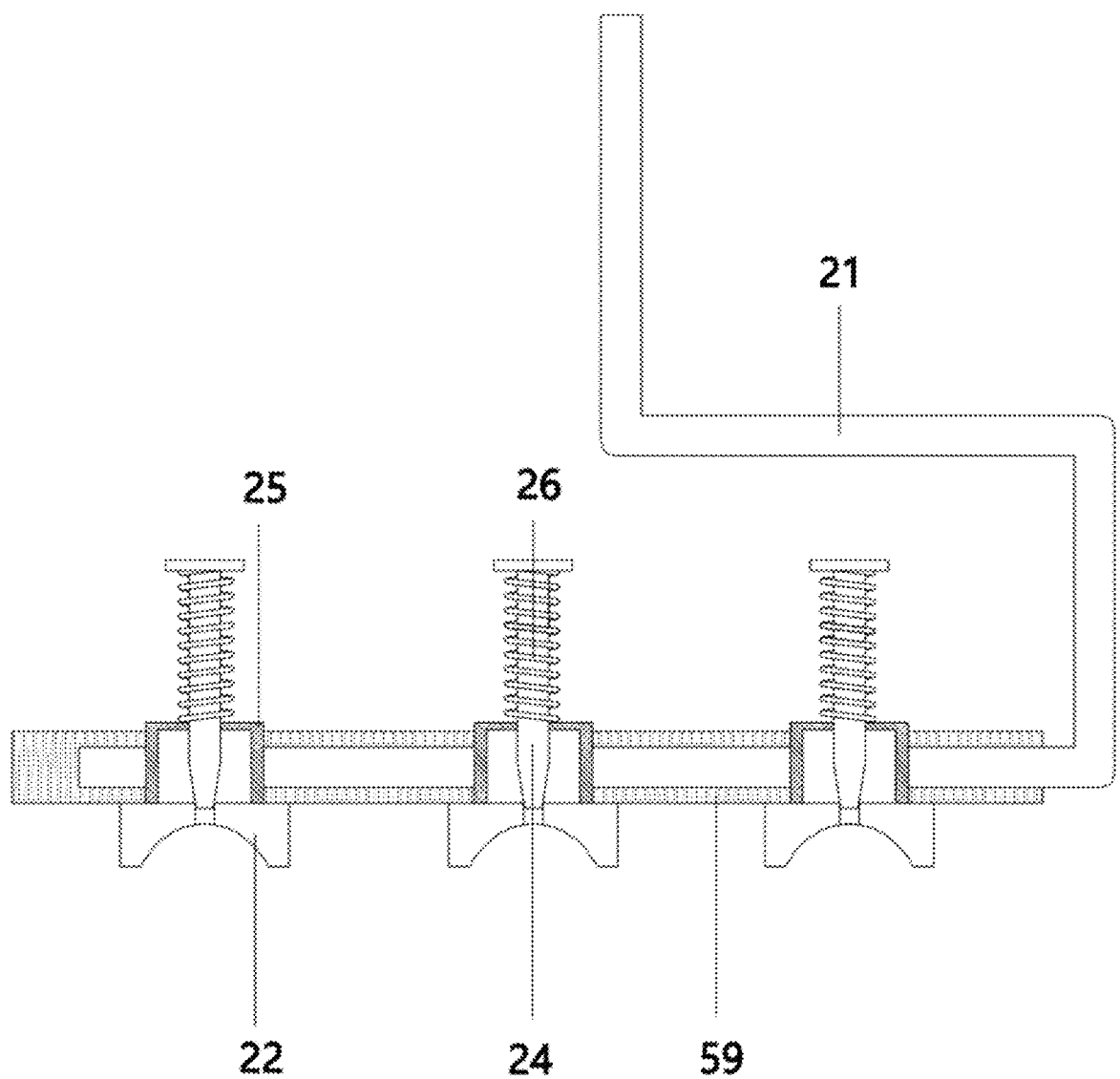
FIG. 7 is a section view of the injection pipe, a dispensing adapter, and a pressure injection wheel that are connected in an initial state according to the present disclosure.
Figure 8:
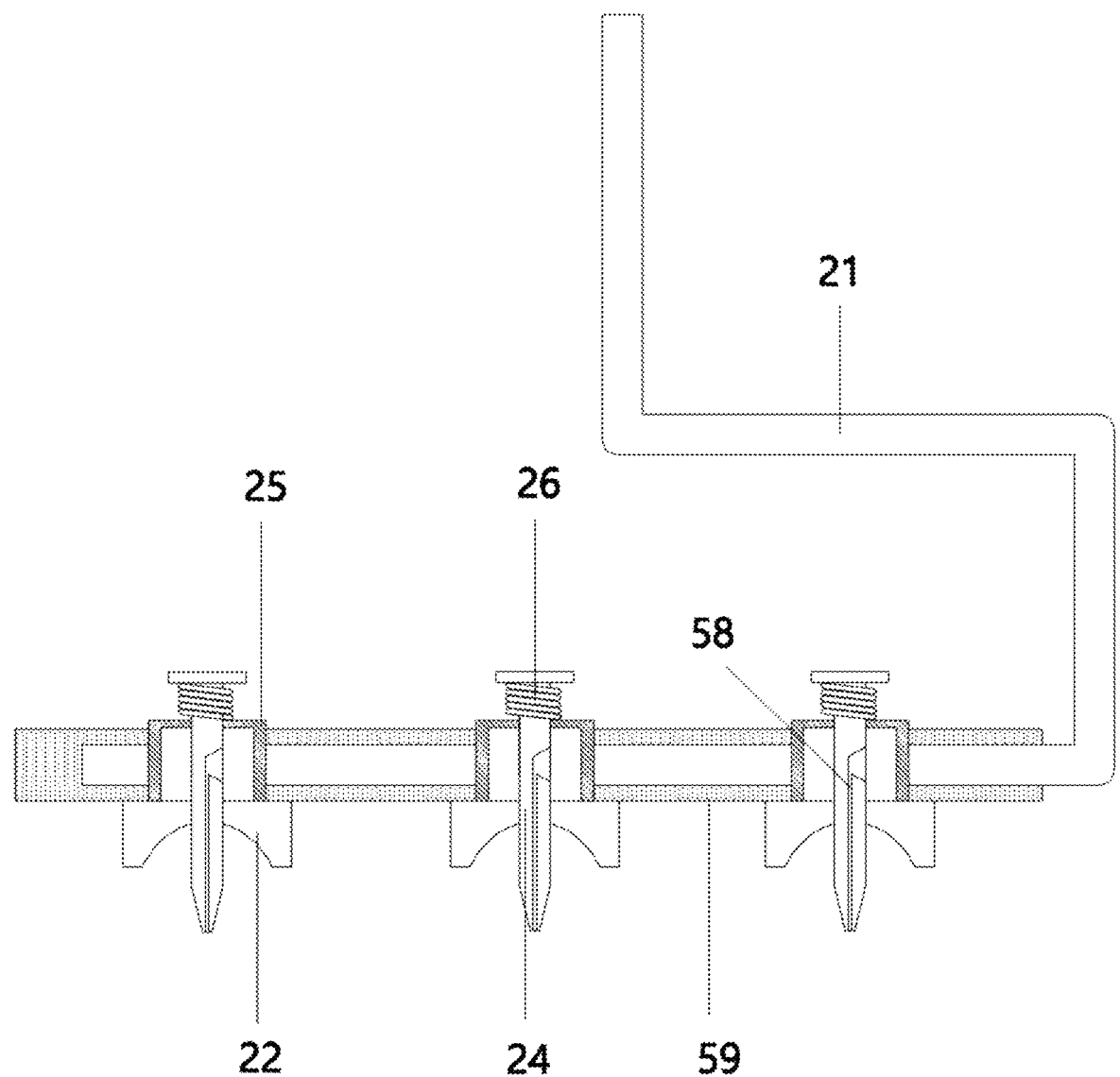
FIG. 8 is a section view of the injection pipe, the dispensing adapter, and the pressure injection wheel that are connected in an injection state according to the present disclosure.
Figure 9:
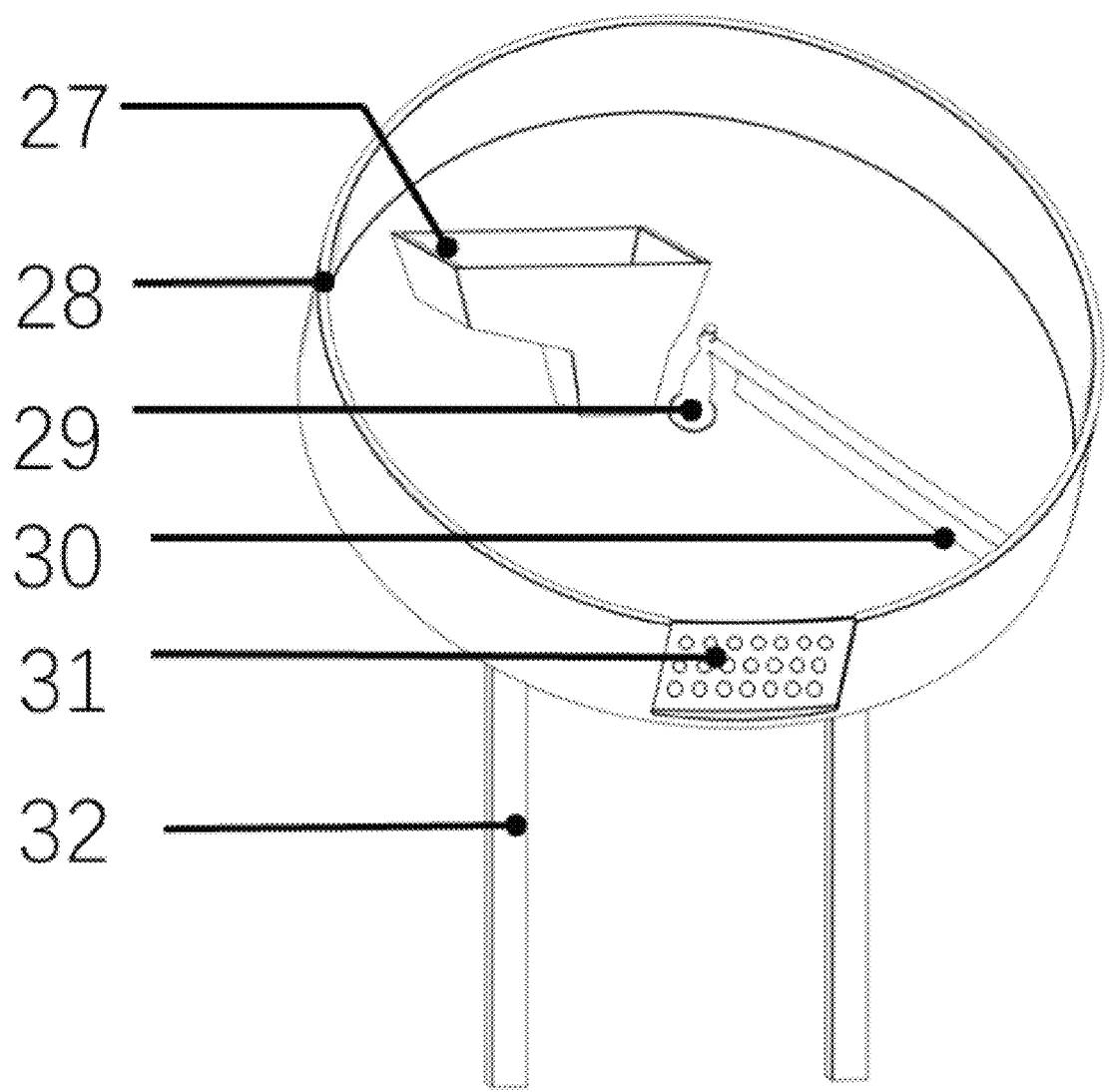
FIG. 9 is a structural diagram of a rolling particle screening module according to the present disclosure.
Figure 10:
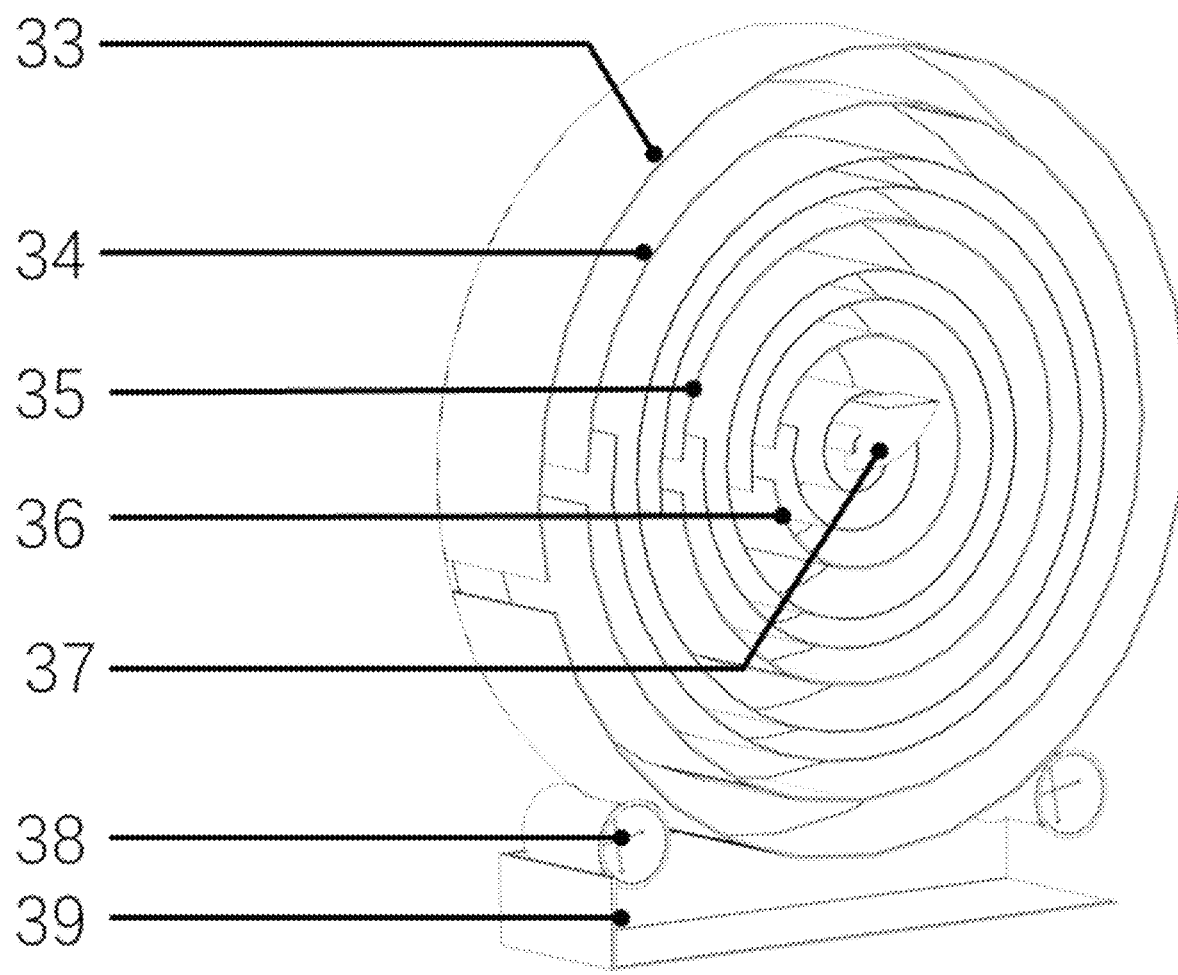
FIG. 10 is a structural diagram of a zonal temperature-controlled sintering module according to the present disclosure.
Figure 11:
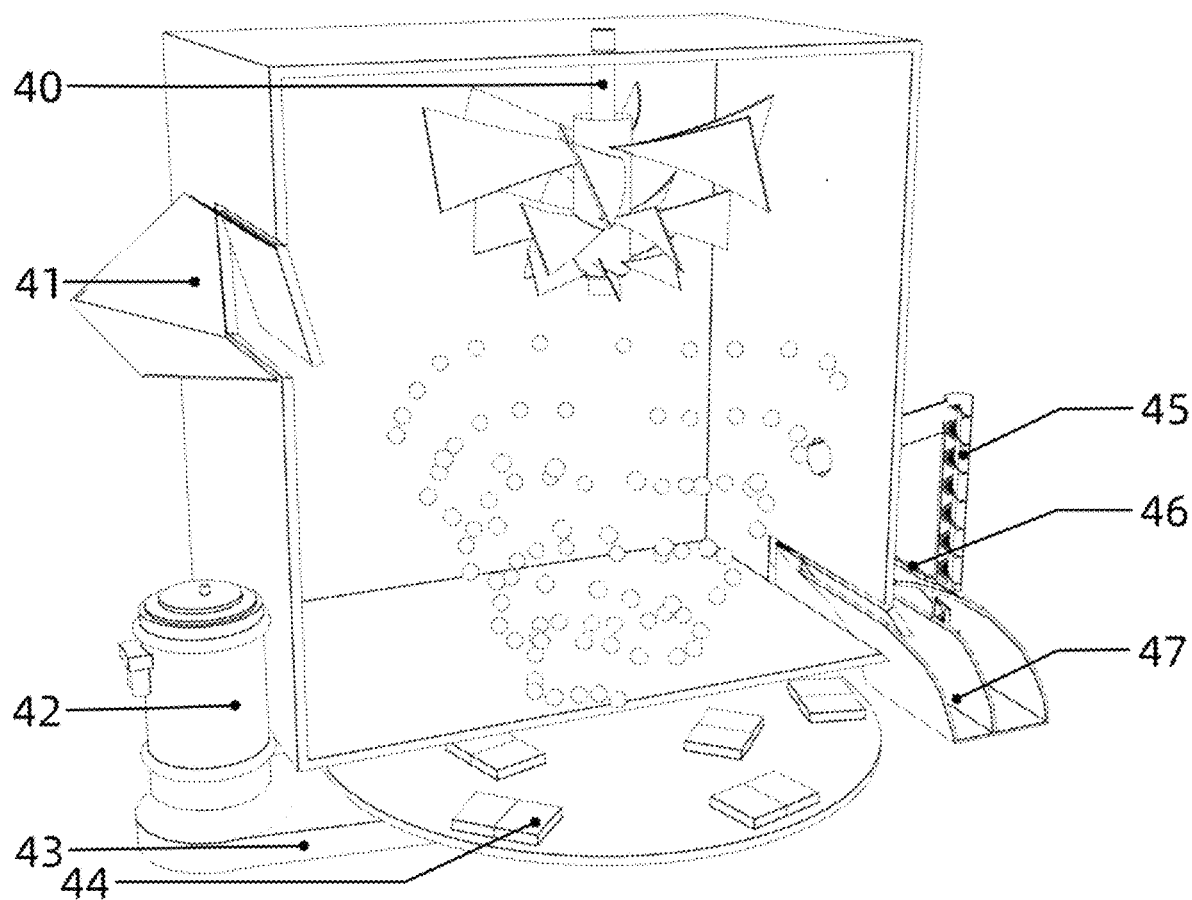
FIG. 11 is a structural diagram of a magnetic shell reinforcement module from a first perspective according to the present disclosure.
Figure 12:
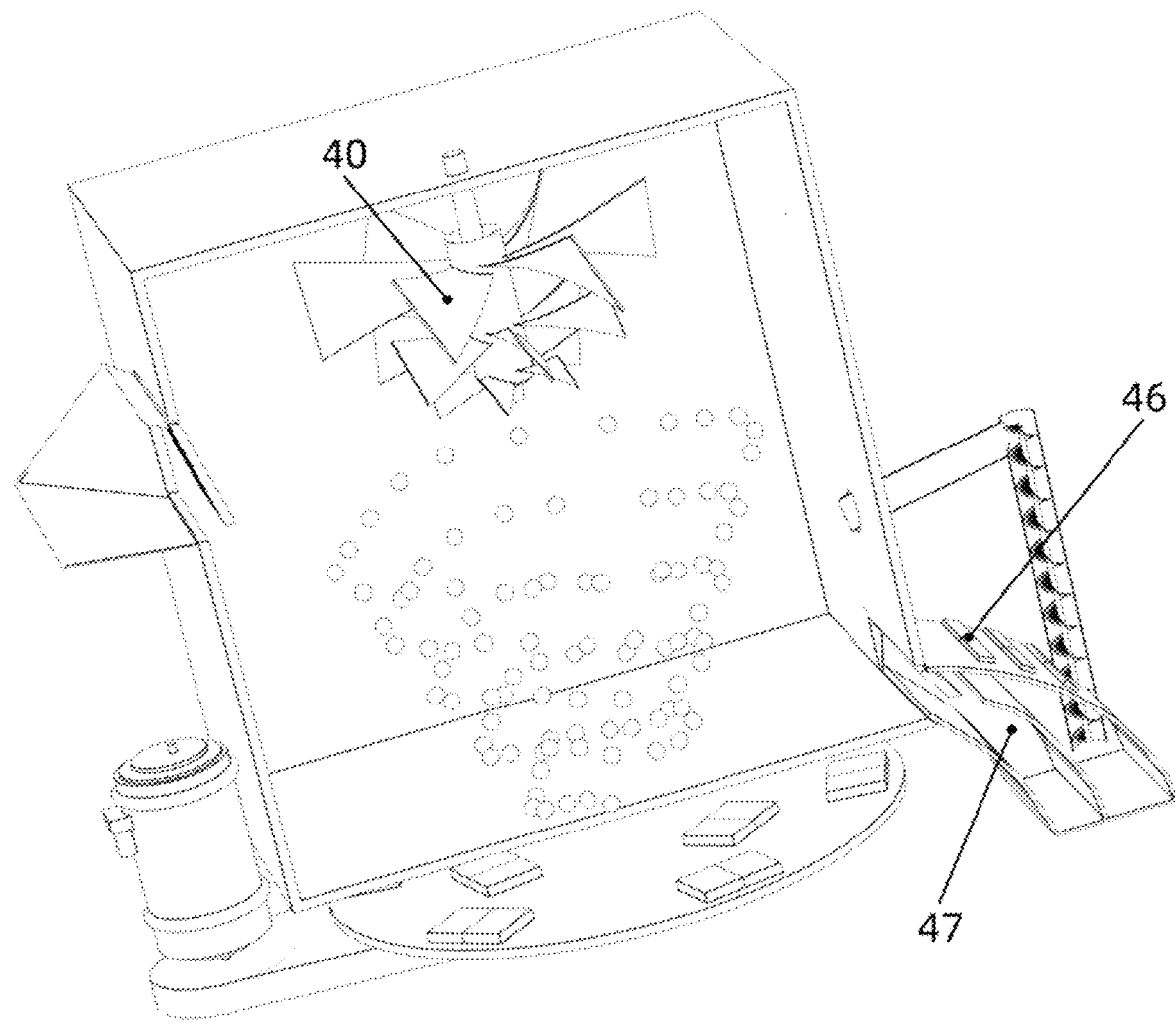
FIG. 12 is a structural diagram of the magnetic shell reinforcement module from a second perspective according to the present disclosure.
Figure 13:
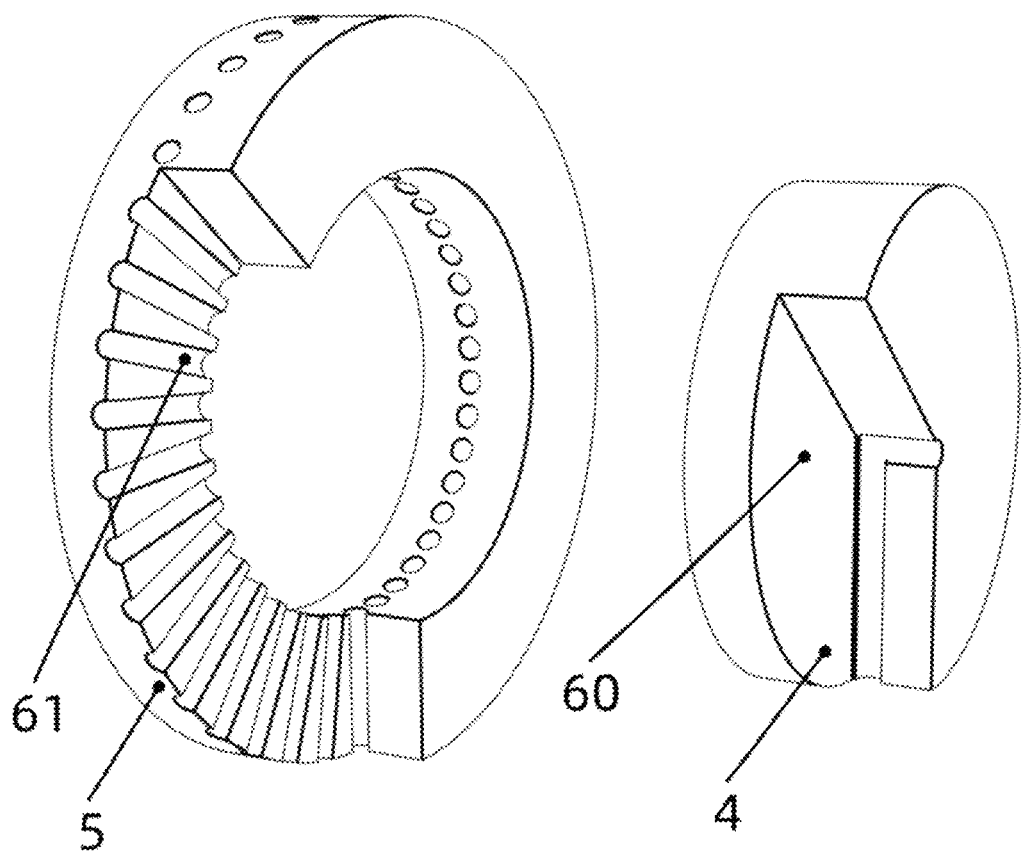
FIG. 13 is an exploded view of the conveying fixed shaft and the conveying rotating shaft according to the present disclosure.
Figure 14:
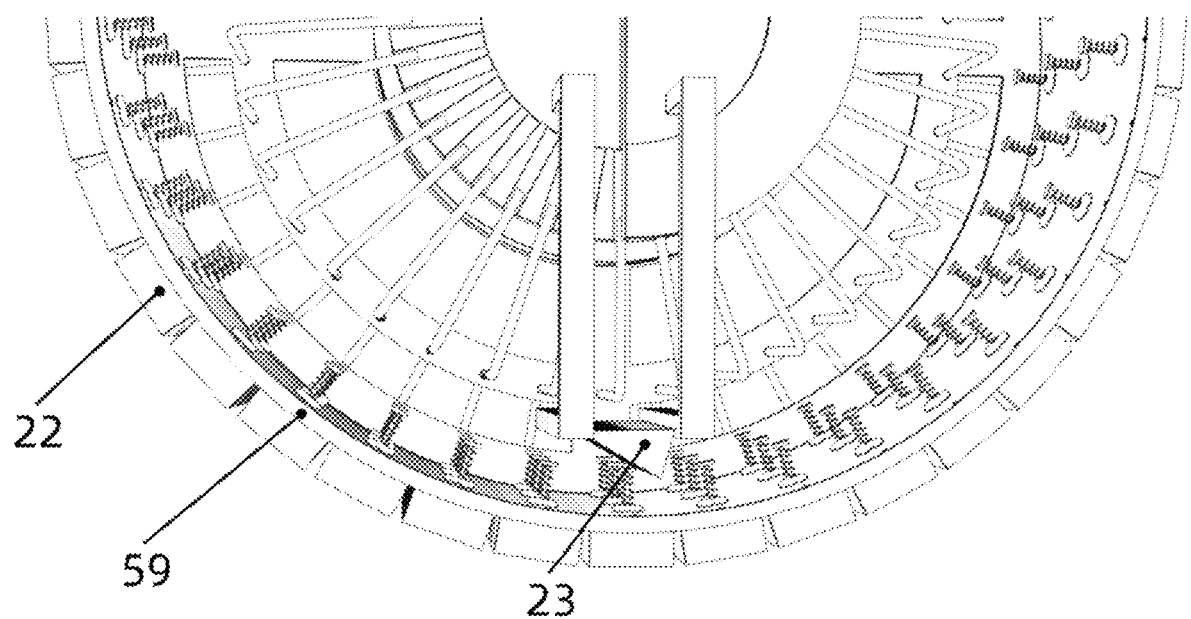
FIG. 14 is a structural diagram showing that the baffle pushes the injection pipe downward according to the present disclosure.

The pressure injection wheel 59 rotates, and the injection pipe 24 on the injection wheel rotates to a lowest position, and the pipe 61 on the conveying rotating shaft 5 is communicated with the liquid conveying line 60 (as shown in FIG. 6). The slurry inside the liquid conveying line 60 enters the dispensing adapter 25 through the pipe 61 and the liquid conveying dispensing pipe 21. The injection pipe 24 is pressed downward by the baffle 23 until the injection pipe 24 is inserted into the center of the material in the rubber hemispherical compaction groove 17 (as shown in FIG. 8). At this point, the slurry in the dispensing adapter 25 is injected into the center of the material in the rubber hemispherical compaction groove 17 through the injection channel 58 in the injection pipe 24. The pressure injection wheel 59 continues to rotate. When the injection pipe 24 leaves the baffle 23, the reset spring 26 rebounds to complete the injection.

The pressure-bearing track continues to move forward until a position below the pressure solidification wheel 15. The rubber hemispherical compaction groove 17 is inserted into the steel cylindrical hemispherical groove 14, and the material inside the rubber hemispherical compaction groove 17 is forcefully compressed into the spherical aggregate. The pressure-bearing track continues to move, and the spherical aggregate falls off under its own gravity and is sent to the rolling particle screening module by the first conveyor belt 51.

Figure 15:
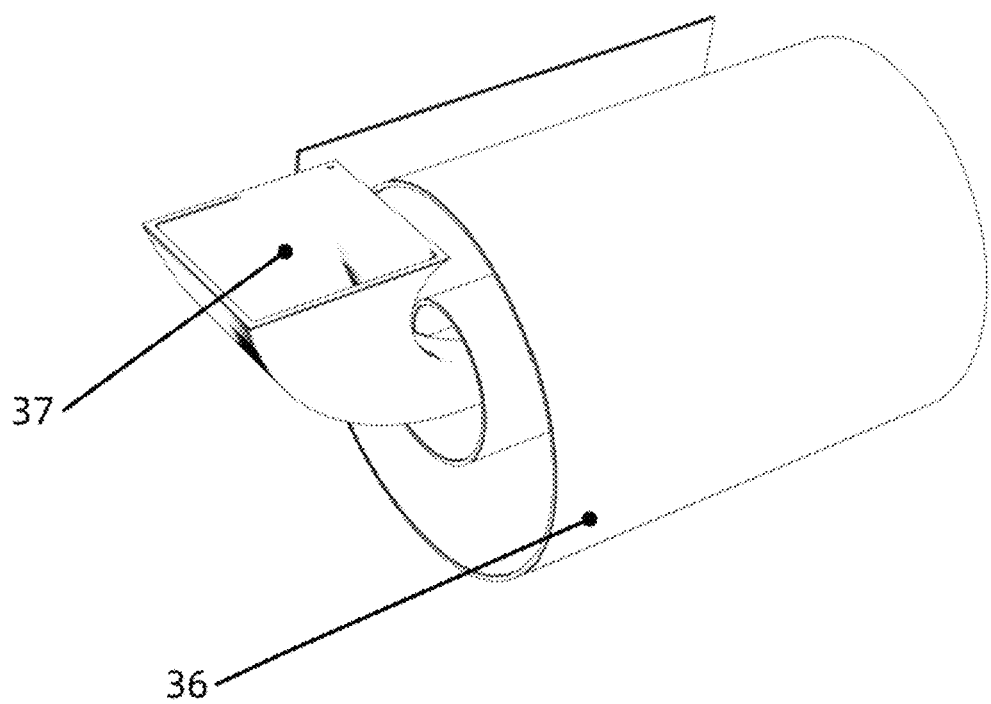
FIG. 15 is a structural diagram of a feeding hopper and a first-level spiral enclosure according to the present disclosure.

The scraper 30 rotates within the disc enclosure 28. The scraper 30 (the scraper 30 is an elastic rubber strip scraper) strongly pushes the spherical aggregate to continue rolling, making the surface of the spherical aggregate compact and smooth. The spherical aggregate falls to the sieve plate 31 and is screened through the sieve plate 31. The spherical aggregate falls to the receiving hopper 53 and is conveyed by the second conveyor belt 54 to the feeding hopper 37 (as shown in FIG. 15, a bottom outlet of the feeding hopper 37 extends to the center position inside the first-level spiral enclosure 36). Finally, the spherical aggregate enters the zonal temperature-controlled sintering module through the feeding hopper 37.

The spherical aggregate rapidly rolls within the spiral track on the disc (including the first-level spiral enclosure 36, the second-level spiral enclosure 35, the third-level spiral enclosure 34, and the fourth-level spiral enclosure 33). Different temperatures are applied by the multi-level enclosure zone (i.e., the first-level spiral enclosure 36, the second-level spiral enclosure 35, and the third-level spiral enclosure 34) to complete the sintering of the spherical aggregate. The spherical aggregate is subjected to cooling treatment in the outermost enclosure zone (i.e. The fourth-level spiral barrier 33), preventing the loss of activity of the spherical aggregate at high temperatures.

Finally, the spherical aggregate inside the fourth-level spiral enclosure 33 cools down and falls into the hopper 39, and the spherical aggregate in the hopper 39 is conveyed to the third conveyor belt 55. The third conveyor belt 55 conveys the spherical aggregate to the case 56 through the feeding port 41.

The electric motor 42 drives the turntable and the electromagnets 44 on the turntable to rotate. The electromagnets 44 apply magnetic force to the steel balls, causing the steel balls to rapidly rotate inside the case 56. In this way, the spherical aggregate is rapidly impacted by the 5 mm 32-hedron vertex-passivated steel balls, thereby removing the weak parts on the surface and making the surface smooth and dense.

Meanwhile, as a variable-speed eddy current fan, the fan 40 generates a conical airflow from top to bottom and from the center to both sides, thereby improving the efficiency of surface shell reinforcement for the spherical aggregate.

After the shell reinforcement, the spherical aggregate enters the corresponding accommodating receptacle 47 under the action of the distribution magnet 46, thereby achieving material separation through magnetic sorting. The spherical aggregate in the backmost accommodating receptacle 47 returns the case 56 through the steel ball return conveyor 45, allowing the spherical aggregate to be reused.

The preparation of the aggregate is completed. A brush is used to remove residual powder from the pressure injection wheel 59, the pressure solidification wheel 15, and the pressure-bearing track, as well as residual materials from other modules.

The present disclosure provides a function of pressure-injecting slurry with a specific function into the center of the artificial aggregate to improve the overall performance of the artificial aggregate. The present disclosure injects the specific slurry according to requirements to achieve specialized production. The present disclosure can perform 12-24 slurry injections per second, with the pressure injection wheel 59 rotating at a speed of 0.2-1 m/s.

The present disclosure designs a pelletizing device for the artificial aggregate (i.e., the pressure solidification wheel device) to rapidly pelletize the aggregate. The present disclosure preliminarily pelletizes the conveyed aggregate through the mutual compression of the rubber hemispherical compaction groove 17 and the steel cylindrical hemispherical groove 14, thereby forming the pelletized aggregate with a particle size of 5 mm to 5 cm.

A pressure rebound device (i.e. The elastic wheel set 16) with controllable force is provided on the main body of the rubber track (i.e. The pressure-bearing track) to provide pressure for the forming process. Based on the cross-section of the rubber injection mold, the pressure can reach 2-5 MPa to complete the molding and extrusion of the aggregate. Multiple columns of extrusion can be completed simultaneously each time, improving the pelletization rate of the aggregate. The waste in the pelletization process will be re-pelletized, resulting in a pelletization rate of 99% for the aggregate.

The present disclosure applies microwave-based zonal temperature-controlled solidification treatment to the artificial aggregate, which is achieved through the sintering turntable (i.e. a rotating disc), enhancing the mechanical properties and durability of the aggregate. The microwave heating part is wound around the side plate according to temperature requirements. The temperatures at these levels increase gradually, and the temperature ranges are set as follows: 0-400° C. for the first level, 400-800° C. for the second level, and 800-1,200° C. for the third level. Finally, the anaerobic environment air cooling zone is designed to prevent aggregate oxidation. The disc speed is adjustable, with a maximum speed of 10 m/s, to achieve rapid solidification and improve work efficiency.

The present disclosure designs the pelletization, polishing, and solidification of the artificial aggregate, achieving fine polishing of the aggregate surface and achieving secondary solidification. The present disclosure uses strong magnetic force to drive the 5 mm 32-hedron vertex-passivated vacuum-formed steel balls (i.e. steel balls) to perform high-speed high-frequency rotational impact on the surface of the aggregate in the equipment, so as to reinforce the shell of the pelletized aggregate. The present disclosure can produce 600 kg of aggregates with a density of 300 kg/m$^3$ per hour.

The present disclosure solves the problem of single-material artificial aggregate and meets the high performance requirement. The present disclosure forms a formula for waste such as fly ash, carbide slag, and desulfurization gypsum according to relevant chemical ratios. The consistency is adjusted by the heavy oil to form the basic material of the artificial aggregate, and the fine gangue slurry is injected into the center of the aggregate under high pressure. The present disclosure fully considers the physical and chemical properties of the waste, maximizes the retention of waste activity, and improves the comprehensive performance of the artificial aggregate.

In order to achieve efficient pelletization of the artificial aggregate, the present disclosure is based on the extrusion rebound principle of high-elasticity low-damping rubber (i.e. The rubber hemispherical compaction groove 17) to pelletize the artificial aggregate. According to the shape characteristics of the rubber hemispherical compaction groove 17 and the steel cylindrical hemispherical groove 14, the present disclosure compresses the semi-finished artificial aggregate with the center grouted into balls, and adjusts the pressure of the pressure rebound device, such that the aggregate wraps around the central slurry, ultimately achieving pelletization. Meanwhile, the present disclosure adopts multiple grooves for matching pelletization, which can achieve the goal of rapid pelletization.

To solve the lightweight problem, the present disclosure utilizes heavy oil to effectively protect the activity of waste. During the pressure injection process of the gangue slurry, the carbon-containing slurry permeates outward. During the sintering process, pore development is enhanced. In this way, the present disclosure reduces the amount of heavy oil used and achieves miniaturization and uniform distribution of pores.

To solve the hollowing problem of the artificial aggregate, the present disclosure considers the weak effect of the core material in the aggregate under load and combines the high-carbon gangue from Inner Mongolia, China. On this basis, fine gangue slurry is injected into the semi-finished aggregate, and the injection volume of the gangue slurry is controlled according to the hollow degree. During the sintering process, carbon combustion forms cavities, and a part of the $CO_2$ produced is absorbed by the internal calcium carbide slag of the aggregate, which enhances the performance of the aggregate and achieves a certain effect of carbon fixation and sequestration.

Most of the $CO_2$ enters the fourth-level spiral enclosure 33 and provides a carbon dioxide environment for fourth-level anaerobic cooling. The design ensures that the aggregate in the fourth-level spiral enclosure 33 is in an anaerobic environment.

The present disclosure utilizes microwave activation sintering to achieve microwave activation and precise temperature control. The early stage of sintering is implemented through microwave activation rapid solidification, and the later stage thereof is implemented through sintering, fully expanding the activity of waste and reducing production energy consumption.

The present disclosure solves the problem that the oxidation effect in ordinary production reduces the material property. Based on $CO_2$ recovery and heat in the production process, the present disclosure adopts $CO_2$ air-cooling heat exchange technology to achieve cooling, carbon fixation, heat recovery, etc., strengthening the physical characteristics of the aggregate, reducing carbon emissions, and achieving carbon sequestration.

The present disclosure solves the following problems, namely, severe deformation and microcrack development of the artificial aggregate after sintering, as well as aggregate volume deformation and loose surface after sintering. The present disclosure uses the 5 mm 32-hedron vertex-passivated vacuum-formed steel balls to perform continuous high-frequency high-speed impact under the driving of the rotating magnetic disc, so as to remove surface debris and protrusions of the aggregate. The continuous low-force high-frequency impact reinforces the outer shell of the aggregate, corrects the accuracy particle size of the aggregate, and improves the surface compactness of the aggregate.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A device for preparing an artificial aggregate by pressure injection and solidification of a powder-based solid waste, pelletization, and magnetic shell reinforcement, comprising a pressure injection and solidification module, a rolling particle screening module, a zonal temperature-controlled sintering module, and a magnetic shell reinforcement module that are arranged in sequence from front to back, wherein the pressure injection and solidification module, the rolling particle screening module, the zonal temperature-controlled sintering module, and the magnetic shell reinforcement module are connected by conveyor belts; and the pressure injection and solidification module comprises a pressure-bearing track device, a pressure injection wheel device and a pressure solidification wheel device located at front and back sides above the pressure-bearing track device, a powder spraying device located in front of a bottom of the pressure-bearing track device, and a slurry conveying device located in back of the bottom of the pressure-bearing track device;

the pressure-bearing track device comprises a support frame, a pressure-bearing track and front and back elastic wheel sets located on the support frame, and a plurality of sets of rubber hemispherical compaction grooves integrated on the pressure-bearing track; and the elastic wheel sets are configured to apply elastic compression to the pressure-bearing track;

the pressure injection wheel device comprises a conveying rotating shaft, a conveying fixed shaft embedded inside the conveying rotating shaft, and a pressure injection wheel located at an outer side of the conveying rotating shaft and fixed through a connecting frame; a plurality of sets of injection shells are distributed at an outer side of the pressure injection wheel; a vertically downward single liquid conveying line is provided inside the conveying fixed shaft; a plurality of pipes are distributed inside the conveying rotating shaft and connected to liquid conveying dispensing pipes, respectively; and an end of each of the liquid conveying dispensing pipes is connected to an injection pipe through a dispensing adapter;

the zonal temperature-controlled sintering module comprises a first-level spiral enclosure, a second-level spiral enclosure, a third-level spiral enclosure, and a fourth-level spiral enclosure that are arranged in sequence from inside to outside; and two top sides of a hopper are provided with conveying rollers supported at a bottom of the fourth-level spiral enclosure;

an upper front end of the pressure-bearing track is provided with a feeding, crushing, and pushing device for pushing a material in a cylindrical shape into the corresponding rubber hemispherical compaction groove;

the powder spraying device is configured to spray powder into the rubber hemispherical compaction grooves to prevent material adhesion; the slurry conveying device is configured to convey slurry to the conveying fixed shaft; when the conveying rotating shaft rotates, a baffle mechanism inside the pressure injection wheel drives the injection pipe to move downward and pass through the injection shell to inject the slurry into a center of the material in the rubber hemispherical compaction groove; and a reset spring on the injection pipe rebounds to complete the injection; and the pressure solidification wheel device is configured to compress the material in the rubber hemispherical compaction groove into a spherical aggregate; when the pressure-bearing track continues to convey the spherical aggregate, the spherical aggregate falls off due to gravity and is sent to the rolling particle screening module through the corresponding conveyor belt; a scraper of the rolling particle screening module is configured to push the spherical aggregate to continuously roll and enter the zonal temperature-controlled sintering module through the corresponding conveyor belt; when the zonal temperature-controlled sintering module rolls, the spherical aggregate passes through the first-level spiral enclosure, the second-level spiral enclosure, the third-level spiral enclosure, and the fourth-level spiral enclosure in sequence to complete sintering of the spherical aggregate and to undergo cooling treatment inside the fourth-level spiral enclosure; and the spherical aggregate is conveyed to the magnetic shell reinforcement module through the corresponding conveyor belt and undergoes impact shell reinforcement inside the magnetic shell reinforcement module.

2. The device for preparing the artificial aggregate by the pressure injection and solidification of the powder-based solid waste, pelletization, and magnetic shell reinforcement according to claim 1, wherein the feeding, crushing, and pushing device comprises a feeding funnel located at the upper front end of the pressure-bearing track, a crushing gear and a conveying blade arranged in sequence from top to bottom inside the feeding funnel, and an extrusion box connected to a bottom of the feeding funnel; a bottom of the extrusion box is connected to extrusion nozzles; and the crushing gear and the conveying blade are connected by a same rotating shaft.

3. The device for preparing the artificial aggregate by the pressure injection and solidification of the powder-based solid waste, pelletization, and magnetic shell reinforcement according to claim 2, wherein the support frame is in an I-shape; four corners of the support frame are provided with drive wheels, respectively; and the drive wheels are tightly attached to an inner wall of the pressure-bearing track; and the elastic wheel set comprises U-brackets, a wheel axle located on each of the U-brackets, supporting wheels located on the wheel axle, and vertical rods respectively fixed to lower middles of the U-brackets; and the vertical rods each are nested inside a supporting spring and pass through the support frame.

4. The device for preparing the artificial aggregate by the pressure injection and solidification of the powder-based solid waste, pelletization, and magnetic shell reinforcement according to claim 1, wherein the powder spraying device comprises a pressure-bearing powder tank, a powder injection nozzle and a powder air pump fixed to the pressure-bearing powder tank, a powder conveying pipe connected to a discharge port of the pressure-bearing powder tank, and a discharge nozzle connected to an end of the powder conveying pipe.

5. The device for preparing the artificial aggregate by the pressure injection and solidification of the powder-based solid waste, pelletization, and magnetic shell reinforcement according to claim 1, wherein the slurry conveying device comprises a pressure-bearing slurry tank and a slurry tank that are communicated with each other, and a slurry air pump located on the pressure-bearing slurry tank; and a discharge port of the slurry tank is connected to the single liquid conveying line through a slurry conveying pipe.

6. The device for preparing the artificial aggregate by the pressure injection and solidification of the powder-based solid waste, pelletization, and magnetic shell reinforcement according to claim 1, wherein the baffle mechanism comprises a baffle fixing element fixed to the conveying fixed shaft and a baffle located at a bottom of the baffle fixing element; and the end of the liquid conveying dispensing pipe is inserted into the pressure injection wheel; the dispensing adapter is located at the end of the liquid conveying dispensing pipe; the dispensing adapter is communicated with the end of the liquid conveying dispensing pipe and fixed to an inner wall of the pressure injection wheel; the injection pipe is nested inside the reset spring and inserted into the dispensing adapter and the injection shell in sequence; and the injection pipe is further provided with an injection channel.

7. The device for preparing the artificial aggregate by the pressure injection and solidification of the powder-based solid waste, pelletization, and magnetic shell reinforcement according to claim 1, wherein the conveyor belt comprises a first conveyor belt, a second conveyor belt, and a third conveyor belt; and the first conveyor belt, the second conveyor belt, and the third conveyor belt each are driven by drive rollers located at two inner ends thereof;

the rolling particle screening module comprises a disc enclosure fixed by support legs and the scraper located inside the disc enclosure and driven by a central rotating shaft; an accommodating hopper is located above a center of the disc enclosure; a bottom of the disc enclosure is provided with a sieve plate; and a receiving hopper is located below the sieve plate; and the magnetic shell reinforcement module comprises a case, a plurality of steel balls located inside the case, a fan located at an inner top wall of the case, a turntable located below the case, and a plurality of sets of electromagnets fixed to an upper end of the turntable; and an upper front end of the case is provided with a feeding port.

8. The device for preparing the artificial aggregate by the pressure injection and solidification of the powder-based solid waste, pelletization, and magnetic shell reinforcement according to claim 7, wherein the first conveyor belt comprises a front end extending to a position below a back of the pressure-bearing track and a back end extending to a position above the accommodating hopper; the second conveyor belt comprises a front end extending to a position below the receiving hopper and a back end extending to a position above a feeding hopper; and the third conveyor belt comprises a front end extending to a position below a back of the hopper and a back end extending into the feeding port.

9. The device for preparing the artificial aggregate by the pressure injection and solidification of the powder-based solid waste, pelletization, and magnetic shell reinforcement according to claim 7, wherein a lower end of the turntable is provided with a gearbox; a front top of the gearbox is provided with an electric motor; and the electric motor is configured to drive the turntable to rotate through a variable-speed gear set inside the gearbox; and a discharge port at a bottom back of the case is connected to two sets of accommodating receptacles that are distributed from front to back; a backmost accommodating receptacle is connected to the case through a steel ball return conveyor; and a back side wall of the backmost accommodating receptacle is provided with a distribution magnet.

10. The device for preparing the artificial aggregate by the pressure injection and solidification of the powder-based solid waste, pelletization, and magnetic shell reinforcement according to claim 1, wherein the pressure solidification wheel device comprises a pressure solidification wheel and a plurality of sets of steel cylindrical hemispherical grooves distributed at an outer side of the pressure solidification wheel.

* * * * *